United States Patent [19]

Ripert

[11] 4,337,919

[45] Jul. 6, 1982

[54] BEARING RETAINERS FOR A ROTARY VALVE

[75] Inventor: Roger L. Ripert, Concord, Calif.

[73] Assignee: Grove Valve and Regulator Company, Oakland, Calif.

[21] Appl. No.: 275,496

[22] Filed: Jun. 22, 1981

[51] Int. Cl.³ ............................................. F16K 5/06
[52] U.S. Cl. .................................. 251/304; 251/315; 251/367
[58] Field of Search ............... 251/305, 315, 367, 304; 308/8, 15, 22, 139

[56] References Cited

U.S. PATENT DOCUMENTS

| | | | |
|---|---|---|---|
| 3,038,693 | 6/1962 | Dumm | 251/315 |
| 3,348,804 | 10/1967 | Piccardo | 251/367 |
| 3,576,309 | 4/1971 | Zawacki et al. | 251/315 |
| 3,617,025 | 11/1971 | Gerbic et al. | 251/315 |
| 3,624,803 | 11/1971 | Bryant et al. | 251/367 |
| 3,624,804 | 11/1971 | Piccardo | 251/367 |
| 3,737,145 | 6/1973 | Heller et al. | 251/367 |

*Primary Examiner*—H. Jay Spiegel
*Attorney, Agent, or Firm*—Melvin R. Stidham

[57] ABSTRACT

A bearing block for a ball valve or the like which is held in place by clamping it between the valve body end closures. A pair of slots are disposed through the bearing block intermediate the bearing bore and its opposite, ends, and the dimensions of the bearing block outward of the slots are somewhat greater so that compressive forces are lighter in those areas within the ends projections of the bore. In one embodiment, the slots extend through to the ends of the bearing block and in another embodiment they terminate at both ends in drilled holes.

7 Claims, 7 Drawing Figures

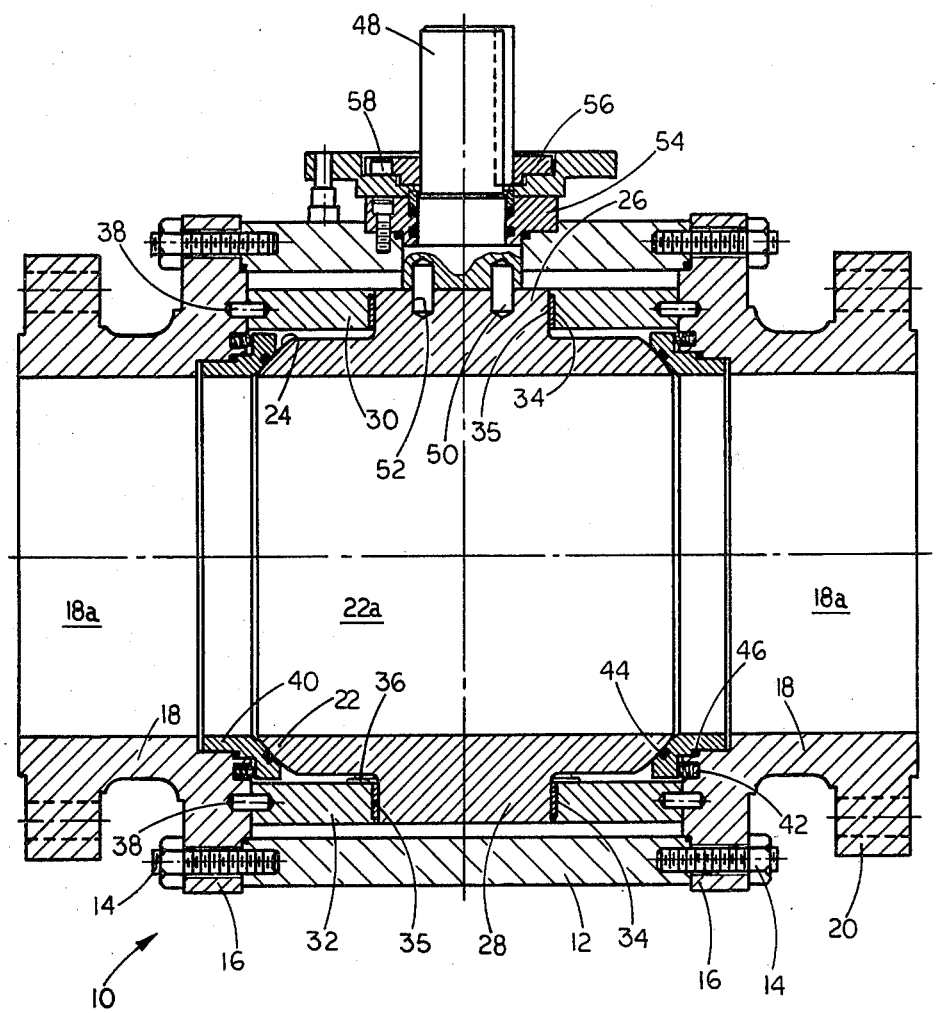
FIG.-1-

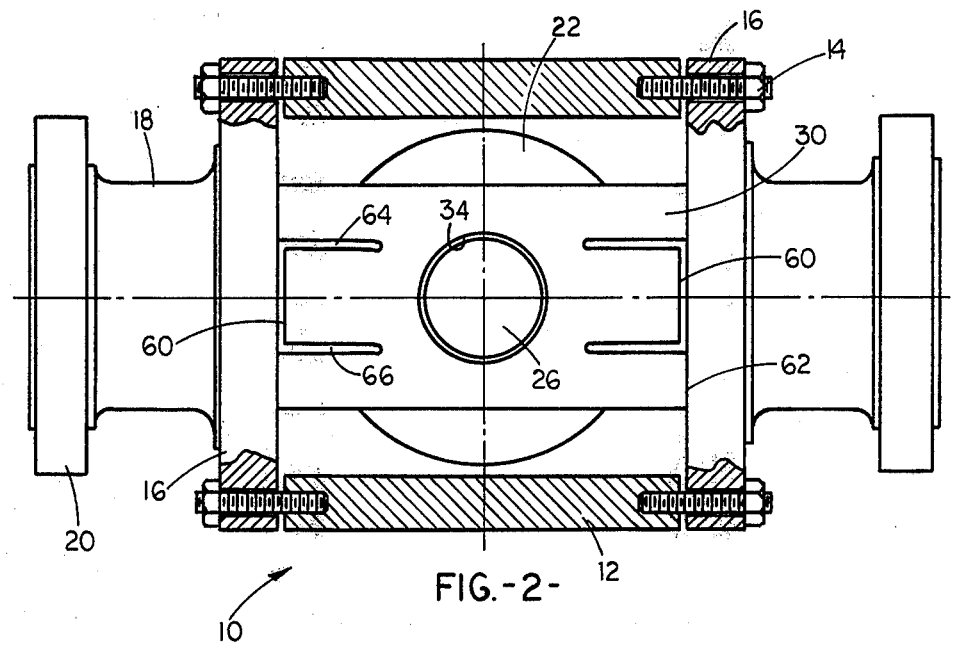
FIG.-2-
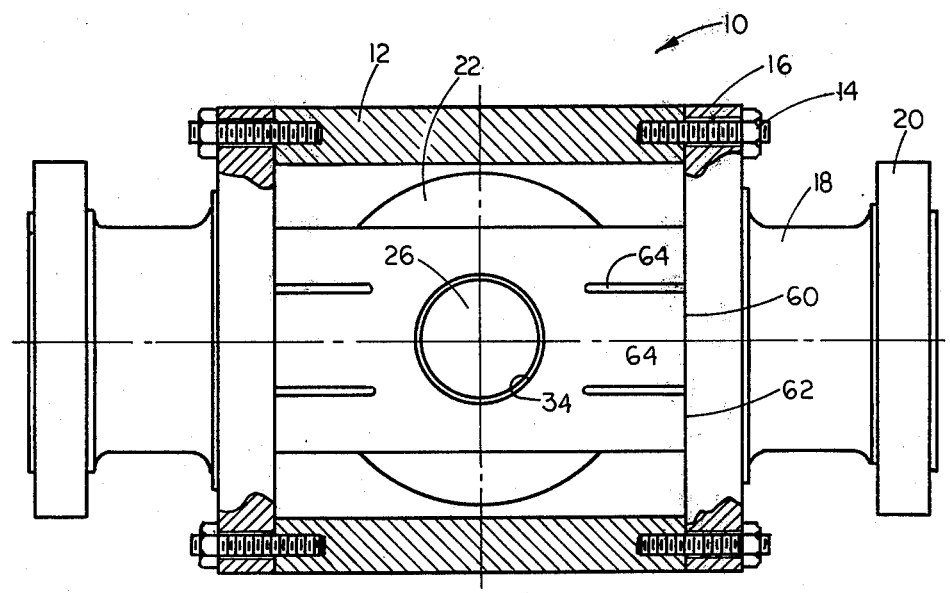
FIG.-3-

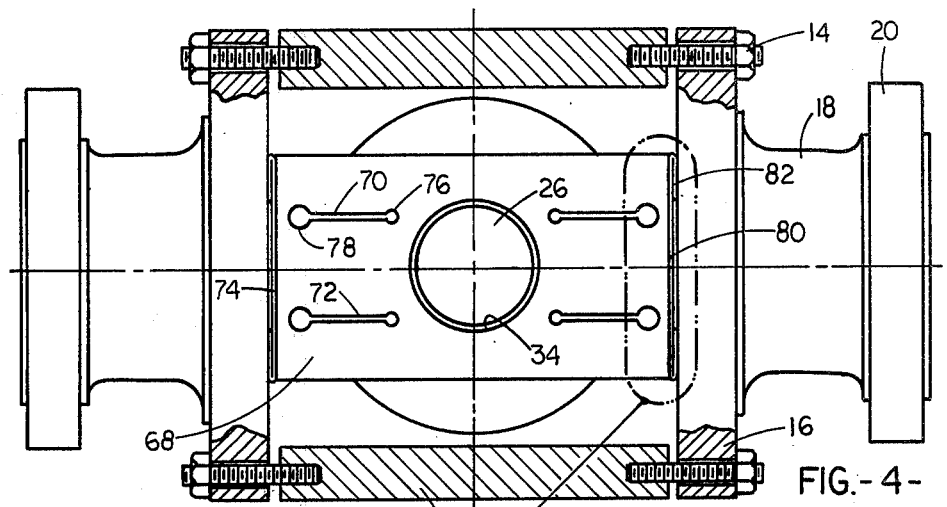
FIG.-4-
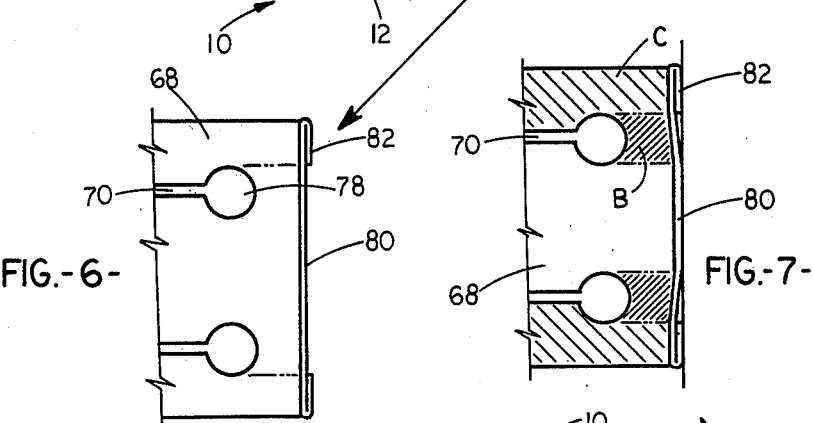
FIG.-6-    FIG.-7-
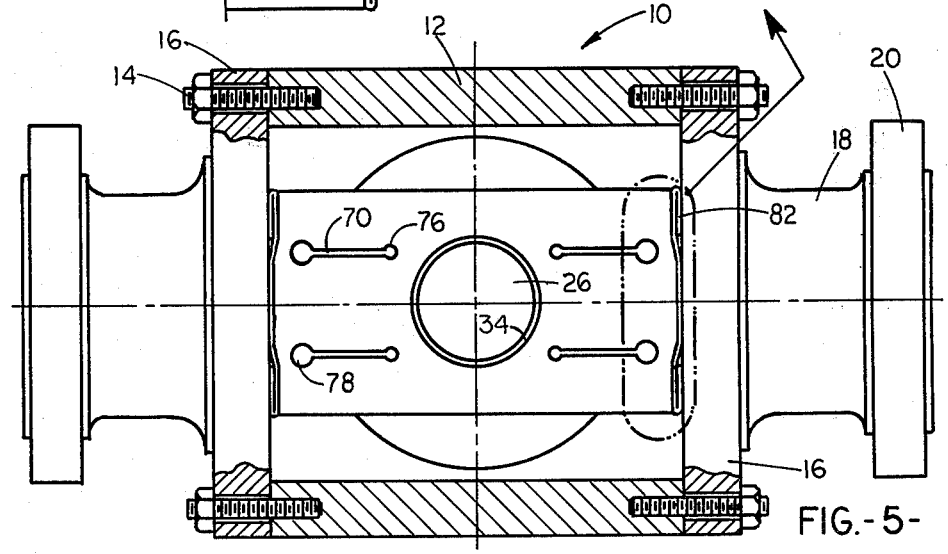
FIG.-5-

BEARING RETAINERS FOR A ROTARY VALVE

BACKGROUND OF THE INVENTION

Ball valves of the type described and illustrated in U.S. Pat. No. 3,348,804 granted Oct. 24, 1967 to J. E. Piccardo have been very successful commercially. Such valves comprise a generally circular body band in which a valve ball with integral trunnions is contained. Rotatably mounted on the trunnions are bearing retainers with a central bore carrying a suitable rotary bushing, and the bearing retainers are secured in place by clamping the ends thereof between the end closures of the valve housing. Although this valve construction has been generally satisfactory, the clamping of the bearing retainers occasionally results in a "pinching" of the ball trunnions, causing excessive stem torque and a rapid wear of the trunnion bearings. This problem is alleviated somewhat by extremely accurate machining of the valve body, the two end closures and the two bearing retainers. However, in the larger size valves, particularly in the higher pressure classes, these components can be extremely heavy and cumbersome, and difficult to handle for precision machining.

OBJECTS OF THE INVENTION

It is an object of this invention to provide a bearing retainer for a rotary valve with integral trunnions which may be manufactured without requirement for close machining tolerances.

It is a further object of this invention to provide a bearing retainer for rotary valve with trunnions wherein torque resulting from clamping of the bearing retainer is minimized.

Other objects and advantages of this invention will become apparent from the description to follow, particularly when read in conjunction with the accompanying drawings.

SUMMARY OF THE INVENTION

In carrying out this invention, there is provided a bearing retainer, which is particularly intended for a rotary ball valve with integral trunnions. As in previous embodiments, the bearing retainers are held in place by clamping them between the two opposing valve body end closures, which are bolted to a body band located between them. In this embodiment, that portion of the bearing retainer end clamping surfaces defined by projections of the bearing bore are separated physically from the areas on both sides thereof by means of through slots intermediate the bore and the clamping surfaces. Then, the areas laterally of the bore projections are made of somewhat greater lengths so that they will absorb a greater percentage of the clamping forces to minimize the pinching action against the ball trunnions.

BRIEF DESCRIPTION OF THE DRAWINGS

In the drawings:

FIG. 1 is a vertical section of a ball valve including the bearing retainer of this invention;

FIGS. 2 and 3 are horizontal sections taken above the bearing retainers, respectively before and after the end closures are tightly clamped;

FIGS. 4 and 5 are horizontal sections of the ball valve showing another embodiment of the bearing retainer, respectively before and after the enclosures are tightly clamped; and FIGS. 6 and 7 are partial views of a bearing retainer before and after clamping showing stresses transmitted to the bearing retainers.

DESCRIPTION OF PREFERRED EMBODIMENTS

The Embodiment of FIGS. 1 and 3

Referring now to FIG. 1 with greater particularity, a ball valve 10 may include a body band 12 of annular configuration, which may be formed from pipe or from plate material which is rolled into a split ring and its ends welded together. Bolted at 14 to the annular ends of the body band 12 are end closures 16 which may include integral hubs 18, as well as flanges 20 for connection into a pipeline (not shown).

A valve ball 22 having a spherical outer surface 24 and cylindrical, integral trunnions 26 and 28 is contained within the body band 12. Rotatably carried on the trunnions 26 and 28 are bearing blocks or retainers 30 and 32 having central bores 34 to accommodate rotary bushings 35, and the lower bearing retainer 32 may carry thrust bearings 36 to accommodate the weight of the ball 22. In assembly, the bearing retainers 30 and 32 are located with respect to the end closures 16 by means of positioning pins 38 and then clamped between the end closures 16 by tightening the bolts 14.

Seat rings 40 which are slidable in the body end closures 16 are urged by springs 42 against opposite sides of the ball 22 so that main seals, such as O-rings 44, can effect seals with the surface of the ball 22. Outer O-rings 46 are provided to preclude leak paths around the seat rings 40.

The ball 22 is rotated between the open position shown, with its flow passage 22a aligned with the flow passages 18a of the hubs 18, and a closed position, with the flow passage 22a disposed normal thereto, by means of a stem 48. Rotation of the stem 48 is transmitted to the ball 22 by means of a pair of pins 50 which are receivable in holes 52 in the upper trunnion 26. The stem is sealed by means of a gland plate 54, and keyed to it is an indicator plate 56 which engages a stop member 58 to indicate position of the valve ball 22.

Previously, if the end surfaces and bores of the bearing blocks 30 and 32, as well as the inner surfaces of the end closures 16, were not precisely finished, an excessive clamping force could be transmitted through the bearing blocks 30 and 32 to the trunnions 26 and 28, causing excessive torque.

Now however, referring to FIG. 2, there is shown the bearing block 30 of this invention, prior to tightening of the bolts 14, which clamp it between the end closures 16. As shown, the mid-portion 60 of each end of the bearing block 30, constituting approximately the area within longitudinal projections of the bore 34 is recessed, so that the lateral portions 62 extend somewhat beyond them to form clamping legs, which bear most of the clamping force from the end closures 60. The clamping legs are isolated from the central portions by means of slots 64 and 66. The amount of clearance in the center portion 60 is such that when the bolts are fully tightened, the bearing blocks 30 will be clamped across the widths of the end surfaces 60 and 62. However, it is apparent that the bulk of the clamping forces will be borne by the lateral portions 62, relieving the portions within the bore projections considerably. With the major portion of the bearing compression being carried by the lateral clamping legs 62 there is no longer a need for close tolerances and torque is not affected appreciably by clamping pressure.

The Embodiment of FIGS. 4 to 7

In this configuration, the bearing block 68 is provided with slots 70 and 72 adjacent each end 74. The slots do not extend all the way to the end 74 but terminate in holes 76 and 78 drilled in the bearing block 68. The drilled holes 76 and 78 provide simple and accurate means of controlling the location of slots and also function as crack arrestors. Moreover, by not extending the slots all the way to the clamping faces 74, there is no risk of warping due to residual stresses, and the clamping legs are protected from buckling in compression. The means of concentrating the clamping forces laterally outward of the slots 70 and 72, comprise thin metal shims 80 which are folded over at their ends 82 (FIG. 5) to provide a double thickness. Hence, the major portion of the compressive forces, when the bolts 14 are clamped to the position shown in FIG. 5, will be borne outside of the slots 70, in the area indicated at C in FIG. 7. In the area indicated at B, the material is subjected to bending stresses and in the central area between the holes 78 the material of the bearing retainer 68 is subjected to only slight clamping pressure.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. A rotary valve comprising:
   a valve body;
   a rotatable valve closure member in said valve body; an actuator stem for said closure member;
   a pair of trunnions on said closure member; one trunnion removably attached to said stem for rotation therewith and the other trunnion located on the opposite side of said closure member from said one trunnion and axially aligned with said one trunnion;
   a bearing block for each trunnion with a bore therethrough rotatably carrying a respective trunnion;
   said bearing blocks located within said valve body;
   means on said valve body clamping said trunnions to hold them in place therein;
   each said bearing block being characterized that it comprises;
   a pair of opposite substantially parallel surfaces to be clamped by complementary surfaces on said body;
   two pairs of parallel slots in said bearing block intermediate said bore and each of said opposite surfaces and substantially perpendicular to said surfaces;
   said slots being disposed so that projected continuations of each pair thereof are approximately tangential to said bore on opposite sides thereof; and
   means directing clamping forces from said body so that greater forces are applied to the portion of said opposite surfaces outside of each pair of slots than to the portion between each said pair of slots.

2. The rotary valve defined by claim 1 further characterized in that:
   each of said pairs of slots extend through to one of said opposite surfaces.

3. The rotary valve defined by claim 1 further characterized in that there is:
   a hole drilled through said bearing block at the end of each of said slots remote from said bearing bore.

4. The rotary valve defined by claim 3 further characterized in that it includes:
   a thin metal shim on each of said opposite surfaces folded back over itself at each end thereof to form said greater dimension.

5. The rotary valve defined by claim 1 further characterized in that there are:
   holes drilled through said bearing block at both ends of said through slots.

6. The rotary valve defined by claim 1 further characterized in that:
   the dimension of said bearing block when uncompressed, from centerline of said bore to said outside portions of the opposite surfaces is greater than from said centerline to said between portions.

7. The rotary valve defined by claim 6 further characterized in that:
   said between portions are recessed back from said outside portions.

* * * * *